United States Patent [19]
Madderra et al.

[11] Patent Number: 4,628,821
[45] Date of Patent: Dec. 16, 1986

[54] ACCELERATION ACTUATED KINETIC ENERGY PENETRATOR RETAINER

[75] Inventors: Jimmy M. Madderra, Huntsville; James G. Williams, Madison, both of Ala.

[73] Assignee: The United States of America as represented by the Secretary of the Army, Washington, D.C.

[21] Appl. No.: 752,275

[22] Filed: Jul. 5, 1985

[51] Int. Cl.⁴ ............................................. F42B 13/06
[52] U.S. Cl. ................................. 102/517; 102/377; 102/518
[58] Field of Search ............... 102/374, 377, 378, 517, 102/518, 519, 520

[56] References Cited

U.S. PATENT DOCUMENTS 2,655,105 10/1953 Hansche ............................... 102/377
3,377,952 4/1968 Crockett ............................... 102/377
3,498,222 3/1970 Birkigt ................................. 102/518

Primary Examiner—Deborah L. Kyle
Assistant Examiner—Ted L. Parr
Attorney, Agent, or Firm—John C. Garvin, Jr.; Freddie M. Bush; Harold W. Hilton

[57] ABSTRACT

A retainer mechanism for releasably securing a kinetic energy penetrator to the forward end of a missile while the missile is stored, transported and subsequently fired at a target such as a tank. The retainer releases the penetrator in flight responsive to acceleration acting on the missile, to reduce drag on the penetrator in its travel to the target.

6 Claims, 7 Drawing Figures

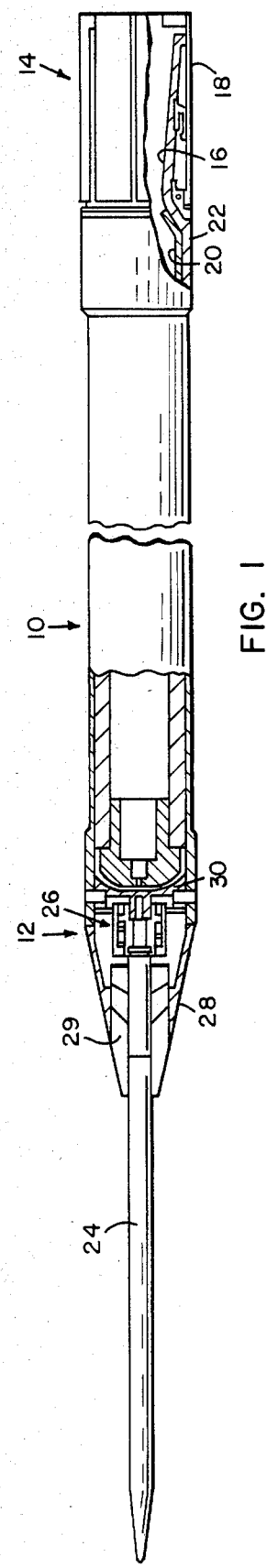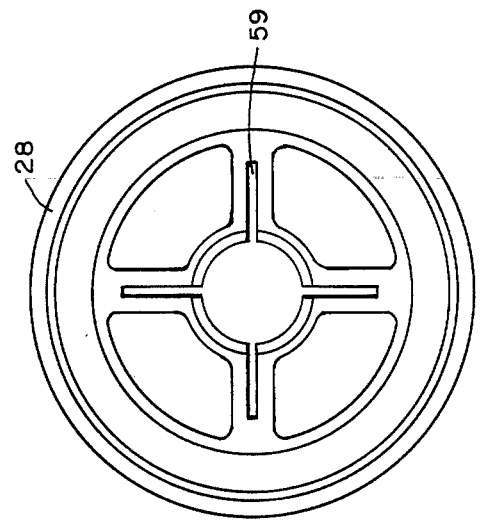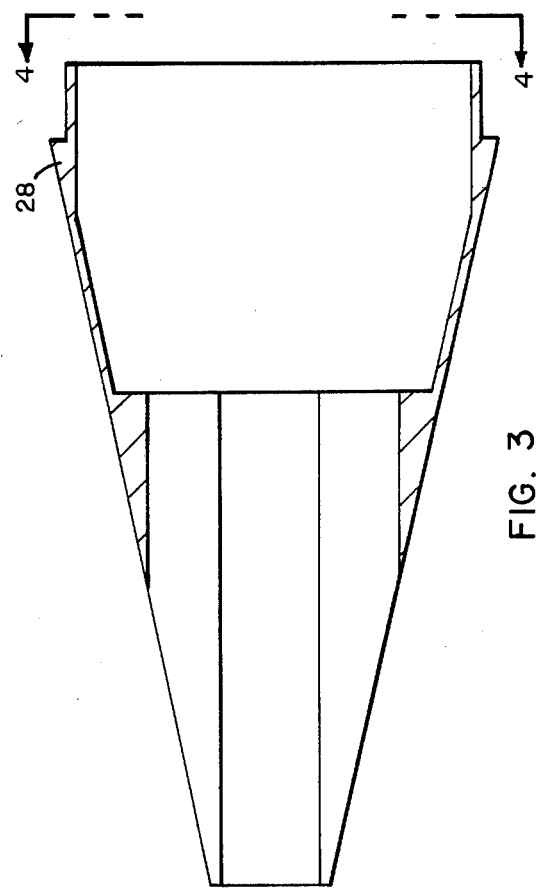

ACCELERATION ACTUATED KINETIC ENERGY PENETRATOR RETAINER

DEDICATORY CLAUSE

The invention described herein may be manufactured, used, and licensed by or for the Government for governmental purposes without the payment to us of any royalties thereon.

BACKGROUND OF THE INVENTION

The Army has experimented with a number of hypervelocity missile/rocket systems that use one or more kinetic energy penetrators instead of an explosive warhead to destroy armor. The object of separating the penetrator from the rest of the rocket system is to reduce drag on the penetrator to a minimum. This greatly increases the effective range of the penetrator. The penetrator must be retained to the propulsion system for handling, shipping and loading. In one specific system, the retainer mechanism must withstand a minimum 50 g handling load in any direction without releasing the penetrator and should be automatic in operation when the rocket is fired from a launcher.

The device of the present invention uses rocket acceleration to actuate the retainer mechanism and high drag on the propulsion system to separate it from the penetrator. This sequence is automatic once the rocket motor is ignited.

The retainer mechanism is simple and highly reliable in operation and provides support, alignment and positive retention between penetrator and proplusion system.

SUMMARY OF THE INVENTION

A retainer mechanism for releasably securing a kinetic energy penetrator to the forward end of a rocket propelled missile. The retainer mechanism includes an annular support member secured to the forward end of the missile and an actuation mass disposed in biased relation about the support member. A plurality of balls are carried in openings disposed around the support member. The balls engage a groove in the aft end of the penetrator for retention of the support member and the penetrator in releasably secured relation. The actuation mass is displaced responsive to accelerations acting on the missile for release of the balls and therefore, the kinetic energy penetrator.

BRIEF DESCRIPTION OF THE DRAWINGS

FIG. 1 is a view partially in section of a rocket propelled missile with a cutaway showing the motor assembly, penetrator assembly and retainer mechanism assembly.

FIG. 3 is a sectional view of the windshield showing the means of supporting the penetrator and enclosing the retainer mechanism.

FIG. 4 is a view along line 4—4 of FIG. 3.

DESCRIPTION OF THE PREFERRED EMBODIMENT

Figure 2:
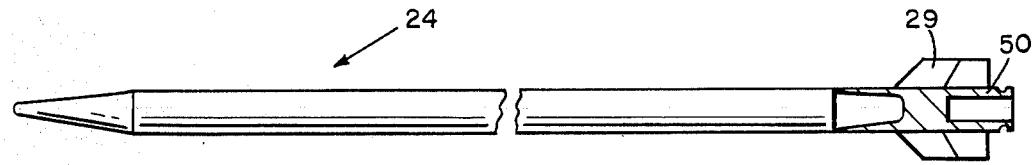
FIG. 2 is an assembly drawing of the penetrator showing the base and groove for the retainer mechanism.

As seen in FIG. 1, a missile 10 includes forward and aft portions 12 and 14, respectively. The aft portion 14 houses the nozzle 16 and folding fins 18. A propellant 20 is provided in the body 22 of missile 10. A kinetic energy penetrator 24 is releasably secured to forward portion 12 of missile 10 by a retainer assembly 26. A windshield 28 is mounted to forward end 12 of the missile to enclose the forward end thereof and to provide for passage of fins 29 of the penetrator therethrough responsive to release of the penetrator from the missile.

As seen in FIGS. 1, 5, 6 and 7, retainer 26 is threadably secured to a head closure member 30 which is secured to the body 22 at the forward end 12 of the missile.

Figure 5:
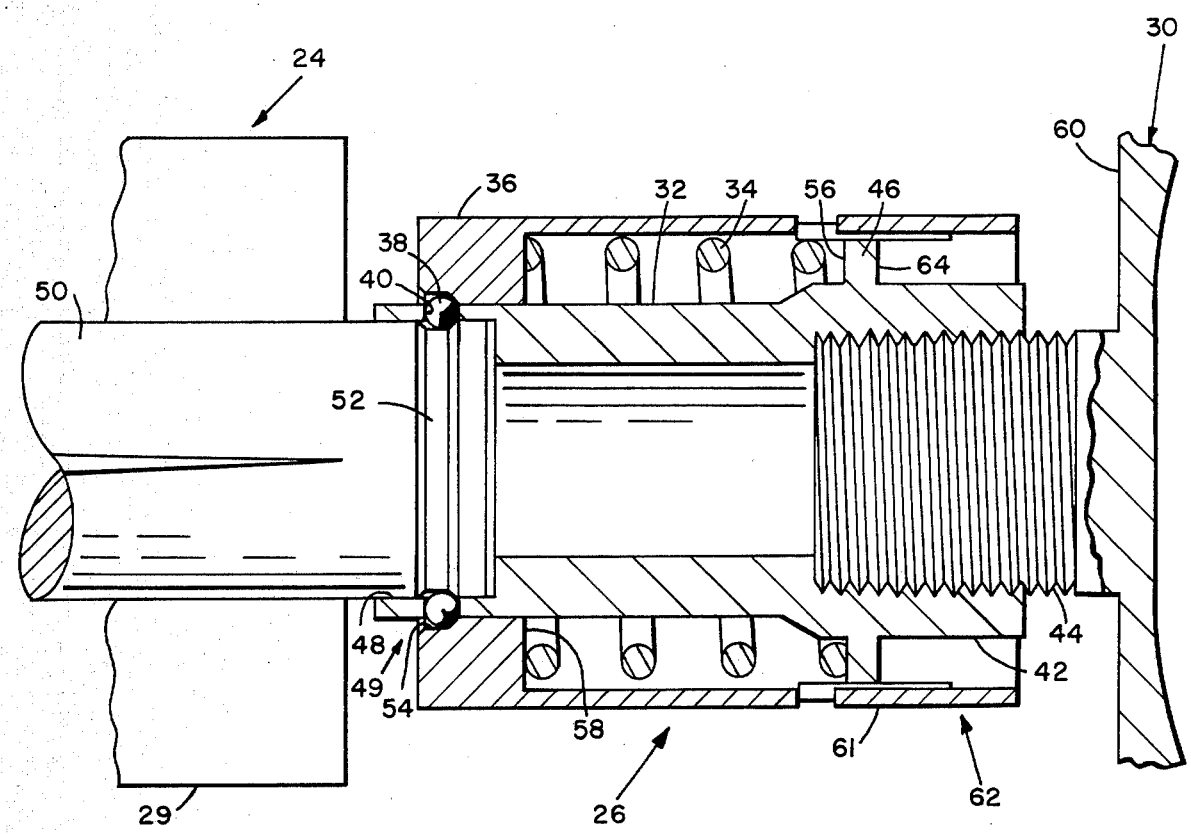
FIG. 5 is a sectional view showing the rocket motor head closure, retainer assembly and penetrator assembly in the normal position for shipping, handling and storage.
Figure 6:
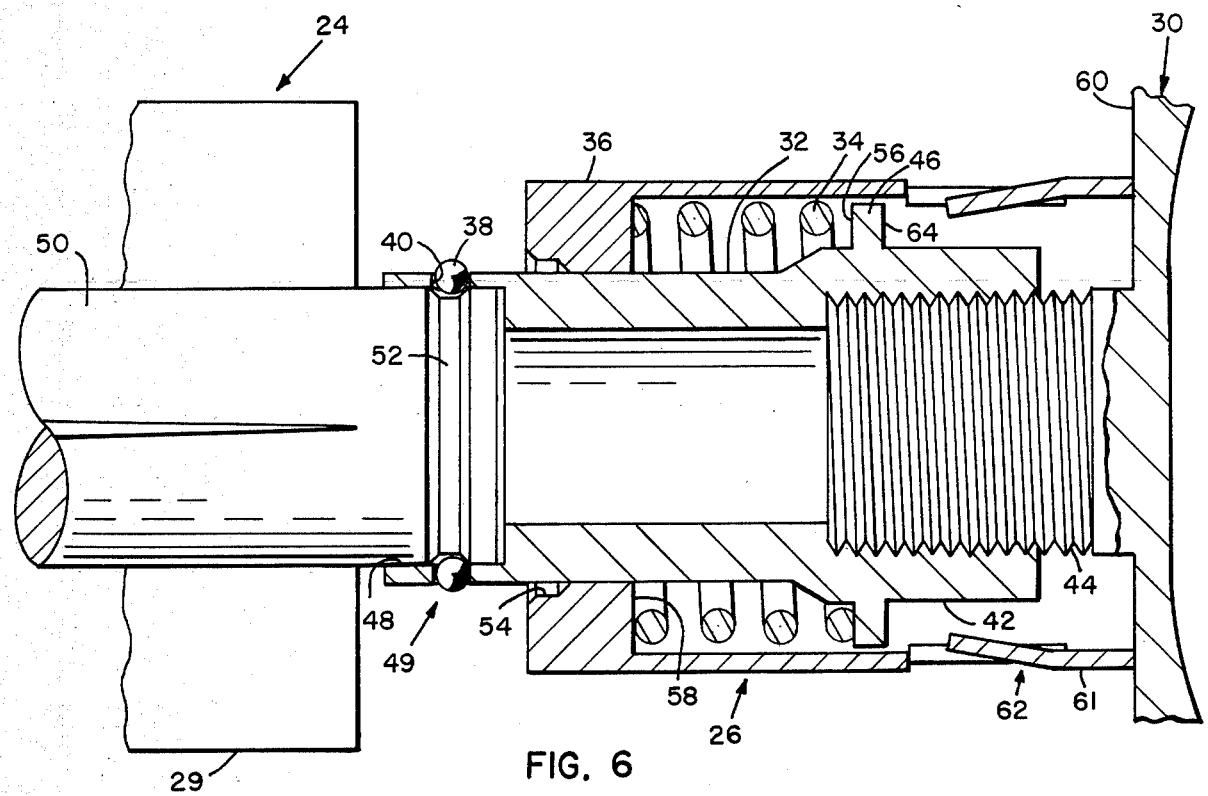
FIG. 6 is a sectional view showing the rocket motor head closure, retainer assembly and penetrator assembly with the actuation mass in the setback position during rocket motor burn.
Figure 7:
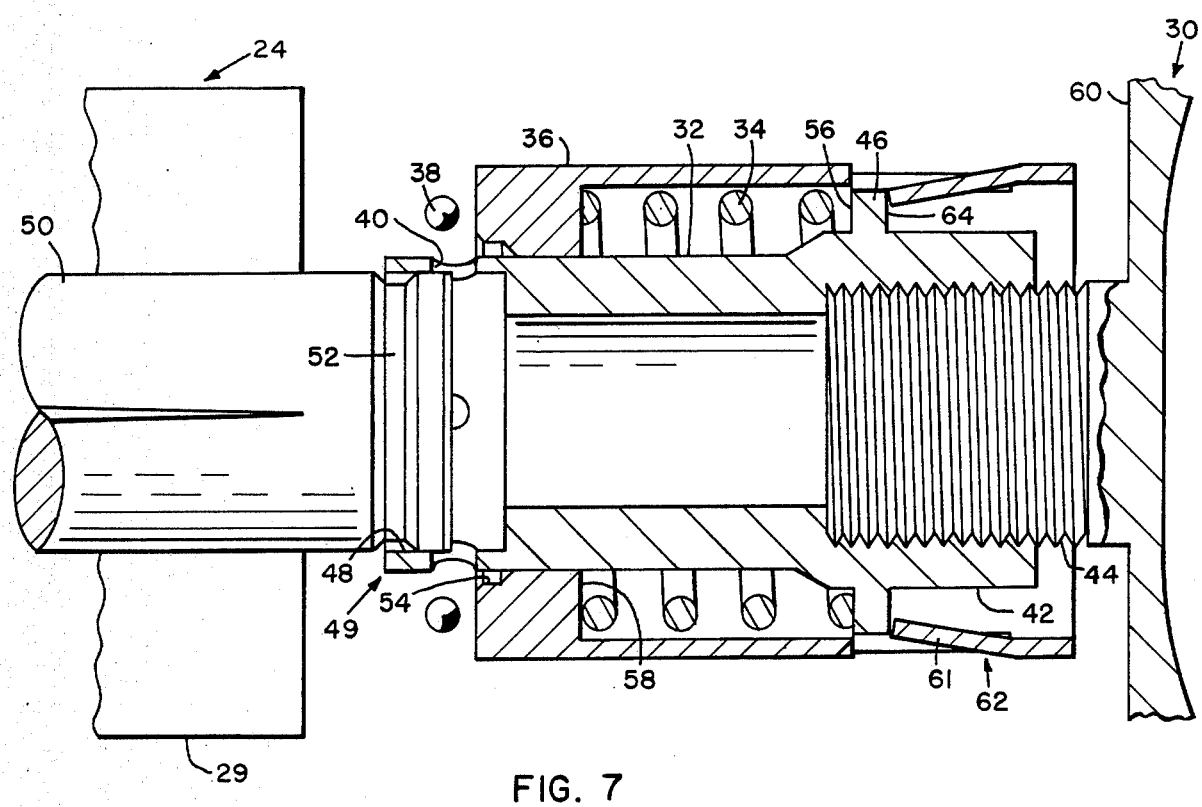
FIG. 7 is a sectional view of the rocket motor head closure, retainer assembly and penetrator assembly with the actuator mass retained by the shoulder on the support, the steel balls released and the penetrator assembly separating from the rocket motor during deceleration.

As more clearly seen in FIGS. 5, 6, and 7, the retainer mechanism 26 is comprised of an annular support member 32, a spring 34 disposed about support member 32, an actuation mass 36 carried about support member 32 and spring 34, and steel balls 38 carried in openings 40 (typically 4) which are spaced around support member 32. The aft end 42 of support member 32 is threadably secured to a threaded projection 44 on head closure member 30. A flange 46 extends from aft end 42 of support member 32. A recess 48 is provided at the forward end 49 of support member 32 to receive the penetrator therein.

The penetrator 24 is secured to support member 32 by inserting the base 50 of the penetrator into recess 48 of support member 32 and inserting steel balls 38 into holes 40 of support member 32 so that the steel balls engage a groove 52 in the base 50 of penetrator 24. The steel balls 38 are retained in place by moving the actuation mass 36 forward until a recessed portion 54 thereof is placed over and shoulders against steel balls 38. The actuation mass is maintained in this position (FIG. 5) by spring 34 abutting against surface 56 of flange 46 and an internal shoulder 58 of actuation mass 36. The windshield 28 is slipped over penetrator 24 and is attached to the rocket motor assembly. Windshield 28 (FIGS. 3 and 4) includes a plurality of grooves 59 through which fins 29 transverse responsive to release of the penetrator from the missile.

The actuation sequence of the retainer assembly 26 begins when the missile 10 is fired. As acceleration of the missile builds, the inertia load on actuation mass 36 compresses spring 34 until the mass rests against the face 60 of head closure 30 (FIG. 6). At this time spring tabs 61 (four spaced around the aft end 62 of actuation mass 36) move inwardly (FIG. 6) and at motor burnout, when spring 34 begins to return mass 36 to its original position, bear against surface 64 of flange 46 to prevent return (FIG. 7). The steel balls 38 are now free to move out of groove 52 of the penetrator 24 and holes 40 of support member 32. The steel balls move out through centrifugal force generated by the spinning rocket and/or cam-out force on the side of groove 53 as the penetrator starts separation (FIG. 7). The penetrator continues to move forward through the windshield 28 as drag on the rocket motor completes separation.

We claim:

1. A retainer mechanism for releasably securing a kinetic energy penetrator to a rocket propelled missile comprising:
   a. a support member having one end secured to said rocket propelled missile and extending therefrom, said support member having a recess at a second end thereof for support of said kinetic energy penetrator therein;
   b. an annular member slidably mounted about said support member;
   c. a plurality of balls carried between said penetrator and said annular member for securing the penetrator to the support member; and,
   d. a spring mounted about said support member and within said annular slidable member, said spring having one end in engagement with said annular slidable member and a second end in engagement with said support member, said spring disposed for compression responsive to accelerations acting on said missile for release of said balls to effect release of said kinetic energy penetrator from said rocket propelled missile.

2. Apparatus as in claim 1 wherein said missile is provided with a head closure member at the forward end thereof, said support member of said retainer mechanism being secured to said closure member.

3. Apparatus as in claim 2 wherein said support member includes a plurality of spaced openings therearound and communicating into said recess at said second end of said support member, said plurality of balls carried in said recess adjacent said openings when said penetrator and said missile are in secured relation.

4. Apparatus as in claim 3 wherein said penetrator includes a base portion having an annular groove therearound, said balls carried in said openings of said support member and said annular groove for secured relation of said support member and said penetrator.

5. Apparatus as in claim 4 wherein said support member includes an aft end having a flange thereon and said annular member having an annular inwardly projecting shoulder, said spring mounted on said support member in abutting relation with said flange and said annular inwardly projecting shoulder for biased relation of said support member and said annular member.

6. Apparatus as in claim 5 wherein said annular member is provided with a plurality of leaf spring members therearound for engagement with said flange responsive to accelerations acting on said missile.

* * * * *